Sept. 30, 1930.   A. HELBRONNER ET AL   1,777,202
ELECTRIC CELL
Filed April 19, 1928

Inventor:
André Helbronner & Eric Dutt.
Attorney:

Patented Sept. 30, 1930

1,777,202

UNITED STATES PATENT OFFICE

ANDRÉ HELBRONNER AND ERIC DUTT, OF PARIS, FRANCE

ELECTRIC CELL

Application filed April 19, 1928, Serial No. 271,376, and in France August 11, 1927.

Our invention relates to improvements in electric cells; both in liquid and in dry cells.

It consists essentially in the utilization at the anode, as a depolarizing agent or active substance of an insoluble ferricyanide (ferricyanide of zinc, copper, silver, or the like).

The depolarizing or active agent is placed round a plate or rod of carbon, or the like, either alone or preferably mixed with pulverized carbon, in the form of graphite coke or the like.

The second electrode or cathode of the cell is preferably composed of a metallic rod or plate of an element having a high position in the electrochemical series, as for example zinc.

The electrolyte used varies with the nature of the substance selected for the cathode and if, for instance, zinc is utilized for this purpose, a solution of chloride of zinc, sulfate of zinc, double cyanide of zinc and sodium or other alkali metal, chloride of calcium and the like may be used.

*Example.*—Assuming that the depolarizer or active substance at the anode is ferricyanide of zinc and that the cathode is constituted by a plate of zinc, the chemical reactions which occur in the cell may be represented as follows:

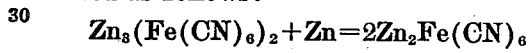

$$Zn_3(Fe(CN)_6)_2 + Zn = 2Zn_2Fe(CN)_6$$

The ferricyanide of zinc being converted into ferrocyanide of zinc with generation of an electromotive force of about 2 volts.

The accompanying drawings illustrate respectively by way of example, a liquid and a dry cell, constructed in accordance with our invention, but it is to be understood that we in no way restrict or limit ourselves to this particular mode of construction.

Figure 1:
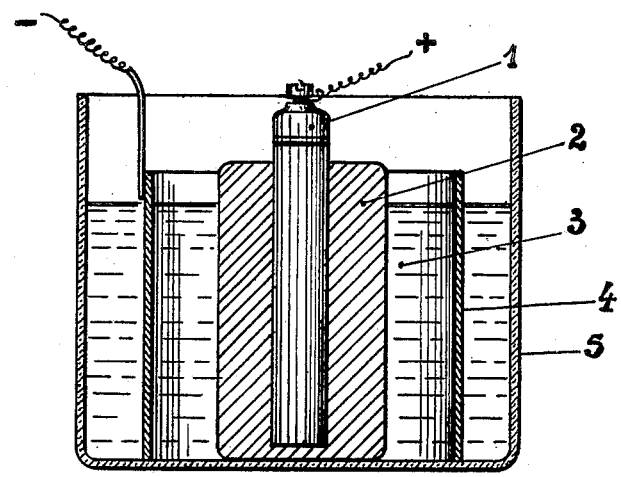

Fig. 1, is a sectional elevation of a liquid cell in which 1 is a rod or plate of carbon, 2 is the depolarizer or active substance (a mixture of ferricyanide of zinc and graphite pressed against 1) 4 is a cathode in zinc; the whole being contained in a receptacle 5, 3 is the electrolyte composed of a solution of chloride of zinc.

Figure 2:
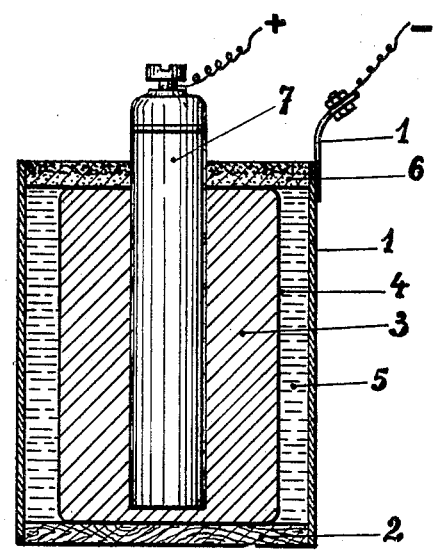

Fig. 2, is a sectional elevation of a dry cell in which 1 represents a zinc or like metallic container, 3 is the depolarizer consisting of a mixture of ferricyanide of zinc and graphite pressed against the carbon rod or plate 7, the whole being placed on an insulating plate 2 (porcelain, paper, glass, or the like), 4 is a wrapping in cloth, absorbent paper, or the like placed round the anode, 5 is a paste containing the electrolyte (chloride of zinc for example) the whole is covered with a layer of sawdust 6, on which is placed a seal of pitch or like substance to render the apparatus hermetic.

Further it has been found that the reaction referred to above is reversible and therefore our invention may also be utilized to construct a secondary cell; it has been shown that ferricyanide on the discharge is transformed into ferrocyanide at the expense of the zinc of the cathode, the reverse action may be effected by connecting respectively the cathode with the negative pole and the anode with the positive pole of a suitable source of electricity.

Having now fully described our said invention, what we claim and desire to secure by Letters Patent is:

1. An electric cell having a mixture of ferricyanide of zinc and carbon as depolarizer or active substance at the anode substantially as set forth.

2. In an electric cell the combination of a depolarizer containing ferricyanide of zinc as active substance, a cathode composed of zinc, and a suitable electrolyte substantially as set forth.

3. In an electric cell the combination of a depolarizer containing a mixture of ferricyanide of zinc and carbon, a cathode composed of zinc and as electrolyte a solution of zinc chloride substantially as set forth.

4. In an electric cell the combination of a depolarizer containing a mixture of ferricyanide of zinc and carbon, a cathode composed of zinc, and as electrolyte a solution of zinc chloride together with a suitable immobilizing agent, substantially as set forth.

In testimony whereof we have hereunto set our hands.

ANDRÉ HELBRONNER.
ERIC DUTT.